C>

United States Patent
Place

(10) Patent No.: US 6,431,818 B1
(45) Date of Patent: Aug. 13, 2002

(54) APPARATUS AND METHOD FOR LOADING AGRICULTURAL MATERIAL

(76) Inventor: Justin Place, 1646 N. 2200 East, Hamer, ID (US) 83425

( * ) Notice: Subject to any disclaimer, the term of this patent is extended or adjusted under 35 U.S.C. 154(b) by 0 days.

(21) Appl. No.: 10/014,762

(22) Filed: Dec. 11, 2001

Related U.S. Application Data

(62) Division of application No. 09/739,481, filed on Dec. 18, 2000, now Pat. No. 6,347,920, which is a division of application No. 09/005,652, filed on Jan. 12, 1998, now Pat. No. 6,186,730.

(51) Int. Cl.$^7$ ............................................... B65G 67/08
(52) U.S. Cl. ........................ 414/808; 414/809; 198/535; 53/475
(58) Field of Search ................................ 414/295, 296, 414/397, 398, 399, 414, 519, 793.8, 794.6, 808, 809, 787; 220/345.1, 349, 351, 661, 676; 198/301, 535, 560; 53/248, 475

(56) References Cited

U.S. PATENT DOCUMENTS

| | | | |
|---|---|---|---|
| 1,224,384 A | * | 5/1917 | Kaukaine |
| 1,886,295 A | | 11/1932 | Morris |
| 3,355,004 A | | 11/1967 | Rupert |
| 3,463,330 A | | 8/1969 | Roberts |
| 3,578,146 A | | 5/1971 | Mehlschau |
| 3,881,611 A | | 5/1975 | Milbourn |
| 3,889,796 A | * | 6/1975 | Bailey et al. ............... 198/301 |
| 4,042,094 A | | 8/1977 | Schmermund |
| 4,067,432 A | | 1/1978 | Powell, Sr. |
| 4,106,649 A | | 8/1978 | Nelson et al. |
| 4,164,294 A | | 8/1979 | Johnson |
| 4,194,343 A | | 3/1980 | Myers et al. |
| 4,257,725 A | * | 3/1981 | Zieschang ................ 414/793.8 |
| 4,501,350 A | | 2/1985 | Muller et al. |
| 4,634,333 A | | 1/1987 | Butterly, Jr. et al. |
| 4,780,041 A | | 10/1988 | Ashby, Jr. |
| 4,802,810 A | | 2/1989 | Gunn |
| 5,148,739 A | | 9/1992 | Fox |
| 5,575,316 A | | 11/1996 | Pollklas |
| 5,794,415 A | * | 8/1998 | Huff et al. ..................... 53/475 |

FOREIGN PATENT DOCUMENTS

| | | | |
|---|---|---|---|
| DE | 136950 | 8/1979 | |
| JP | 55-111323 | * 8/1980 | .............. 414/793.8 |
| JP | 4-112136 | 4/1992 | |
| SU | 975533 | 11/1982 | |

* cited by examiner

*Primary Examiner*—James W. Keenan
(74) *Attorney, Agent, or Firm*—Fitch, Even, Tabin & Flannery

(57) ABSTRACT

There is provided an apparatus and method for reduced impact loading of impact sensitive materials, such as agricultural seed material, into a bin from above. The loading apparatus includes a door selectively movable between a lower position and an upper position. A guide mounts the door at the bin and provides a predetermined path between the lower and upper positions for the door. A drive is used to selectively vary the position of the door along the path in response to accumulation of material loaded from above. The door is first moved to the lower position for initial loading. A material dispenser having a discharge end is extended through an access opening in the bin at the door for initial loading of material therein. As material accumulates in the bin during loading, the discharge end is selectively raised in the access opening to maintain it within a predetermined distance range above such material. The door is also selectively raised to varying positions above the lower position to cover the access opening as material accumulates in the bin.

5 Claims, 5 Drawing Sheets

APPARATUS AND METHOD FOR LOADING AGRICULTURAL MATERIAL

This is a continuation-in-part, of prior application Ser. No. 09/739,481, filed Dec. 18, 2000, now U.S. Pat. No. 6,347,920 which is a division of prior application Ser. No. 09/005,652, filed Jan. 12, 1998, now U.S. Pat. No. 6,186,730, which is hereby incorporated herein by reference in its entirety.

FIELD OF THE INVENTION

The present invention relates to agricultural planters and, more particularly, to reduced impact loading of agricultural material into planter bins.

BACKGROUND OF THE INVENTION

Vast agricultural fields commonly are planted with multi-row planters that discharge seed at appropriate intervals into rows formed in the fields. These planters typically include a number of bins with a top portion designed for loading from above and for carrying a significant amount of seed and a bottom portion adapted to discharge the seed from the top portion for planting.

For efficient planting, it is important for these bins to be large enough to carry an adequate amount of desired seed to avoid downtime associated with loading. In some instances, these bins must be relatively large to accommodate larger seed types, such as potato seed which, in essence, are sliced potato portions. Thus, it is not uncommon for potato planters to have bins as tall as three to five feet.

To load these larger planter bins, a conveyor, auger or other type of transfer device is commonly used to deliver seed from a truck or other supply source. The transfer device then drops the seed into the bin from above through the open top and onto a metal or rubberized surface in the bin.

With these relatively larger bins, it has been found that the loading impact from this significant fall tends to bruise and otherwise damages the seed and enhances the probability of seed piece decay. This is a particular problem with larger, more delicate type seed, such as potato seed. As a result, seed efficiency is significantly reduced which, in turn, causes the cost of planting and the resultant produce to rise.

Thus, there is a need for an apparatus and method for loading relatively large planter bins to address these loading impact concerns. The present invention provides an efficient and cost-effective system that lessens damage caused by impact during loading of the seed using conventional transfer devices.

SUMMARY OF THE INVENTION

In accordance with the present invention, there is provided an apparatus and method for reduced impact loading. The loading apparatus includes a door movable between a lower position and an upper position. A guide mounts the door at the bin and provides a predetermined path between the lower and upper positions. A drive is used to selectively vary the position of the door along the path in response to accumulation to minimize impact force on the material as it is being loaded from a predetermined distance above the door.

The predetermined path may be substantially vertical between the lower and upper positions. The guide also may include a pair of spaced rails to guide movement of the door along the path. Further, the rails may each define a channel along the path, and the door may be provided with rollers that roll in the channel as the door is selectively moved along the path.

The apparatus may further include an actuator arm between the drive and the door. The drive would then selectively actuate the arm to raise and lower the door along the path. A support structure may also be provided for mounting the drive and actuator arm. The actuator arm would be pivotally mounted to the support structure and to the door. The drive may be connected to the actuator arm intermediate the pivotal mounting to the support structure and the door. The actuator arm may define a slot that allows the arm to move arcuately relative to the door as the door moves along the path.

The apparatus may further include a control device in communication with the drive to selectively activate the drive. The control device may coordinate with material accumulation to vary the door along the path.

In another form, there is provided an agricultural loading apparatus for a planter bin to reduce impact on agricultural material loaded with a transfer device having a discharge end portion. The apparatus includes a receptacle having a side wall that defines a loading port capable of receiving a discharge end portion of an agricultural material transfer device to facilitate loading of the receptacle through the side wall at varying heights.

The assembly also includes a door at the loading port which is movable along a predetermined path to selectively expose and cover the loading port. A guide mounting the door at the loading port provides the predetermined path. The apparatus includes a drive for selectively moving the door along the path in response to accumulation of agricultural material during loading of the receptacle through the loading port.

The guide may include a pair of spaced rails to guide the door along the predetermined path. The predetermined path may be substantially vertical. Loading of the receptacle may be done through the loading port with a discharge end portion of an agricultural transfer device at a predetermined distance relative to the door. The door is then movable vertically as agricultural material accumulates in the receptacle. The apparatus also may include a control device to coordinate movement of the door with agricultural material accumulation.

There also is provided a method of reduced impact loading of material into a bin. The method includes providing a bin with a side wall defining an access opening for loading the bin at various vertical heights and a bottom portion extending from the side wall. The method also includes providing a door slidably mounted at the access opening of the bin. The door is movable along a predetermined path between a lower position at initial loading to maximize the access opening and selectively to varying upper positions above the lower position as the bin is being loaded to close the access opening. The door is moved to the lower position for initial loading to minimize loading impact. A material dispenser is provided with a discharge end portion extended into the bin through the access opening over the door and at a predetermined distance above the bottom portion of the bin.

The method also includes selectively raising the discharge end portion in the bin as material accumulates in the bin during loading to maintain the discharge end portion within a predetermined distance range above material generally accumulating in the bin. The method further includes selectively raising the door to varying positions above the lower position to close the access opening as material accumulates in the bin.

The predetermined distance may be generally less than eighteen (18) inches above the bottom portion of the bin at initial loading and thereafter, above the material generally accumulating in the bin after initial loading. The steps of selectively raising the discharge end portion and the door may be generally coordinated contemporaneously as material accumulates in the bin.

The method also may include the steps of measuring material accumulation and sending a signal representing the measurement to selectively raise the door as material accumulates in the bin. The method further may include the step of selectively raising both the discharge end portion and the door generally contemporaneously in response to the measurement of material accumulation.

BRIEF DESCRIPTION OF THE DRAWINGS

The present invention will be described in connection with the accompanying drawings wherein.

DETAILED DESCRIPTION OF THE PREFERRED EMBODIMENT

Figure 1:
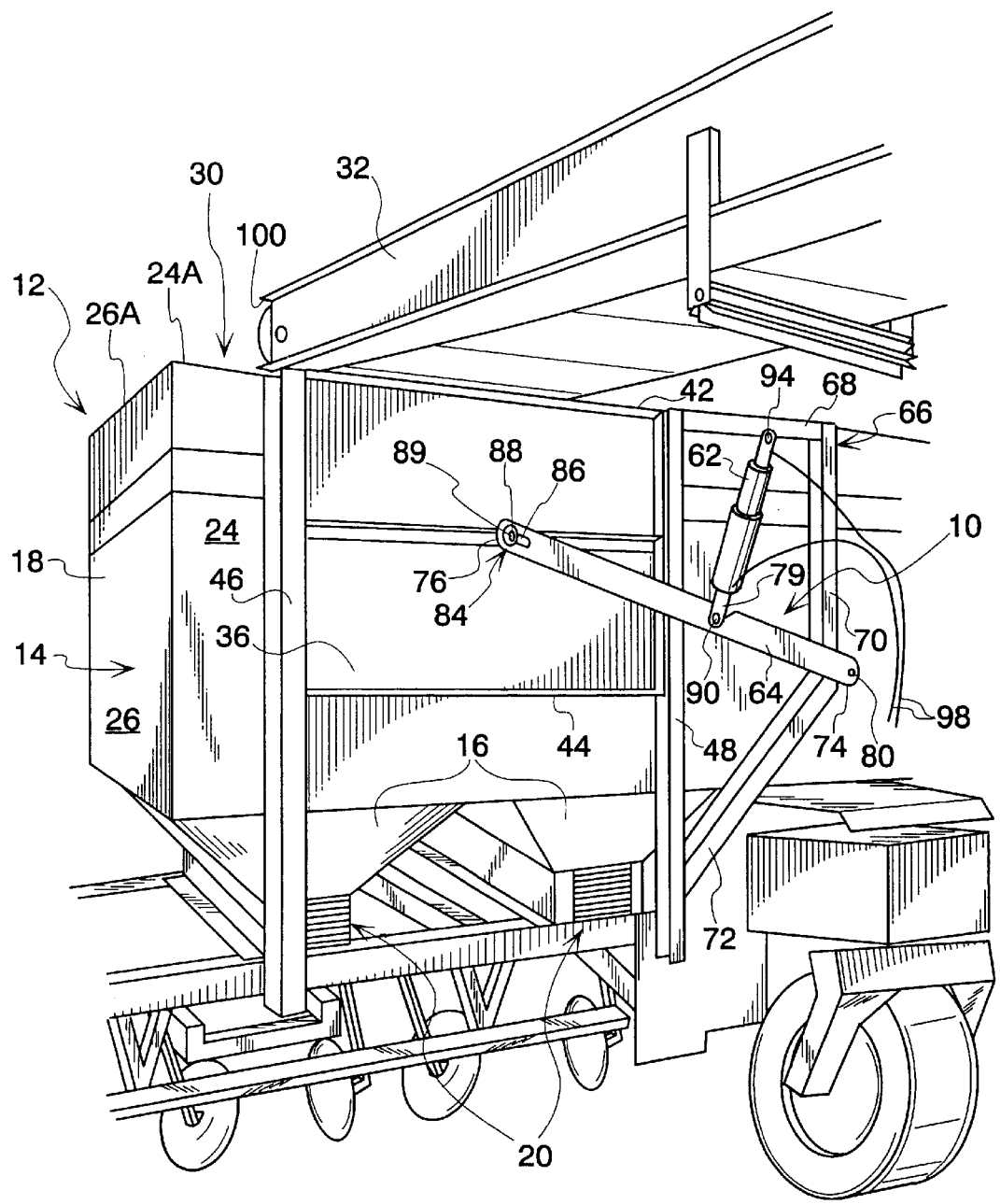
FIG. 1 is a perspective view of an agricultural seed planter bin with an adjustable loading assembly embodying features of the present invention.
Figure 2:
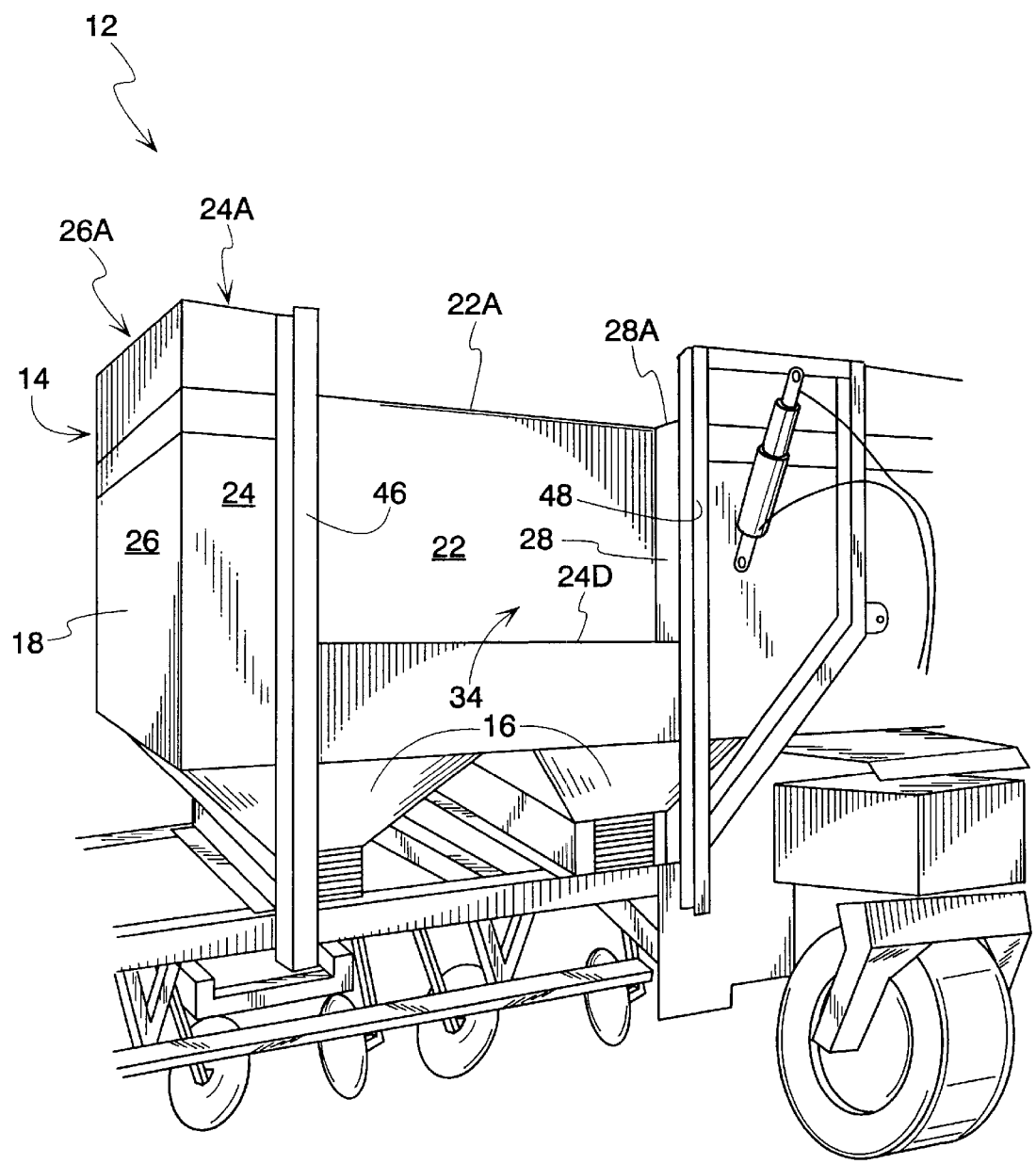
FIG. 2 is a partial perspective view of the planter bin of FIG. 1 to illustrate the bin without the adjustable door of the adjustable loading assembly.

Referring to FIGS. 1 and 2 of the drawings, there is illustrated an adjustable loading assembly 10 embodying features of the present invention for use with an agricultural seed planter 12 to facilitate reduced impact loading of seed material, such as delicate potato seed. The seed planter 12 includes a bin 14 having a pair of downwardly tapered lower portions 16 and a rectangularly shaped upper portion 18. The lower portions 16 are provided with a dispensing mechanism 20 for discharging agricultural seed, at appropriate intervals into rows formed in a field. The upper portion 18 is designed for loading and transporting the seed for planting. The upper portion 18 includes a front wall 22, a rear wall 24, and a pair of side walls 26 and 28. Each of the walls 22, 24, 26 and 28 terminates at its upper end with an upper edge 22a, 24a, 26a and 28a, respectively, to define an open top 30 through which a conveyor 32, auger or other type of transfer device delivers seed from a source container to the bin 14 for planting.

During loading, the seed falls from the conveyor into the bin 14. To minimize seed impact during loading, the adjustable loading assembly 10 shifts to allow the conveyor 32 to adjust with the loading operation to reduce the fall distance of the seed. More specifically, the adjustable loading assembly 10 is mounted at the modified rear wall 24 and selectively shifts from a lower position (FIGS. 3 and 6), at the initial loading stages, toward an upper position (FIGS. 4 and 7) at the final stages of loading, as seed accumulates in the bin 14. That is, the loading assembly 10 permits positioning of the conveyor 32 near the lower portions 16 of the bin 14 at the initial loading stages and, as the seed accumulates in the bin 14, the conveyor 32 is raised along with the loading assembly 10 to the upper position for final loading. The ability to lower and raise the conveyor 32 during loading enables the seed drop distance into the bin 14 to be controlled to minimize seed damage. Thus, the loading assembly 10 allows the conveyor 32 to be positioned into the bin 14 so that the fall at the initial loading stages is as short as possible. The preferred seed drop distance is in the range of about 0.0 to 6.0 inches.

Figures 4, 5:
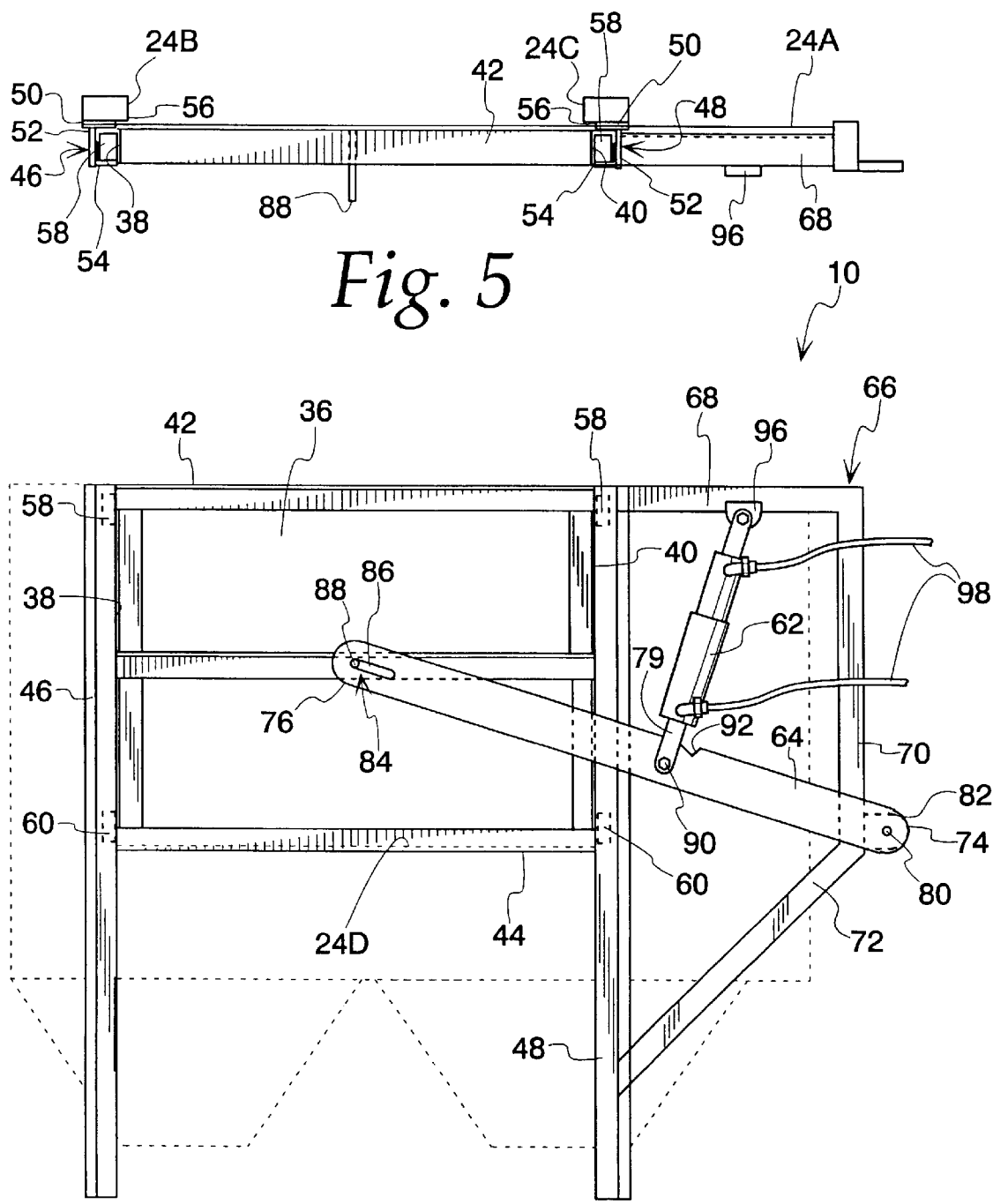
FIG. 4 is an elevational view of the adjustable loading assembly of the planter bin of FIG. 1 illustrating the door in a final loading position.
FIG. 5 is a top plan view of the adjustable loading assembly of the planter bin of FIG. 1 illustrating the door in the final loading position.

Referring to FIGS. 2 and 5, the rear wall 24 of the bin 14 is substantially vertical and frames a generally rectangular access opening 34 through which the conveyor 32 is capable of extending and moving vertically during loading. More particularly, the opening 34 is open-at the top of the bin 14 and is otherwise outlined by two generally parallel side edges 24b and 24c and an interconnecting bottom edge 24d. The opening 34 is sufficiently wide to accommodate the conveyor 32 extending between the side edges 24b and 24c into the bin 14 and being shifted vertically without interference for loading. The distance between the bottom edge 24d and the lower portion 16 is a predetermined minimal distance when the conveyor 32 is moved adjacent the bottom edge 24d for initial loading. Depending on the depth of the lower portions 16, the seed drop distance is significantly reduced by allowing the conveyor 32 to be lowered below the top edges 22a, 24a, 26a and 28a of the bin 14.

Figure 3:
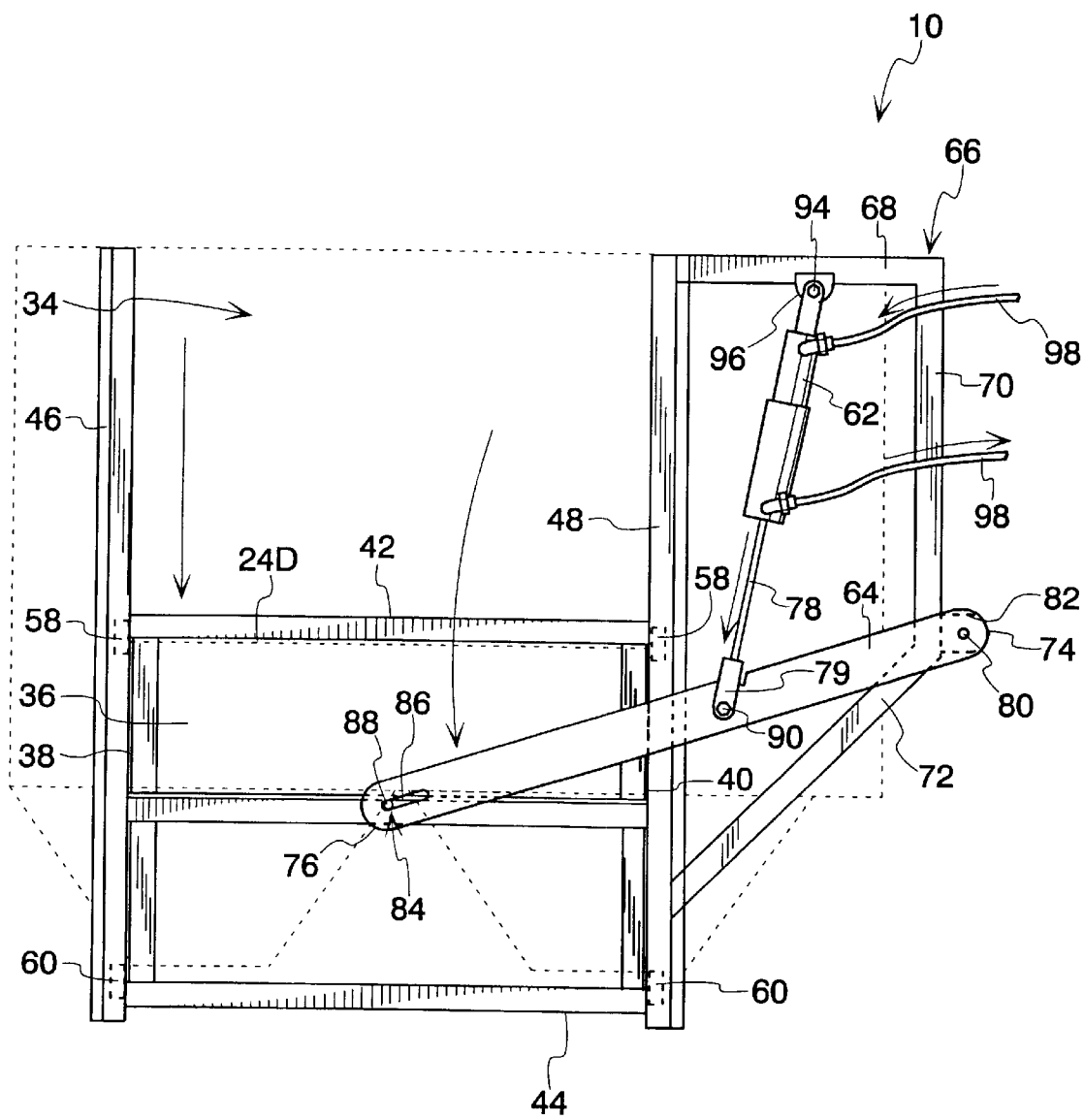
FIG. 3 is an elevational view of the adjustable loading assembly of the planter bin of FIG. 1 illustrating the door in an initial loading position.

Referring to FIGS. 1, 3 and 4, the door assembly 10 includes a generally rectangular door 36 that is slidably mounted at the opening 34 in the rear wall 24 and is operable to expose the opening 34 and selectively close the opening 34 as seed accumulates in the bin 14 during loading. The door 36 is defined by a pair of side edges 38 and 40, a top edge 42 and a bottom edge 44. The side edges 38 and 40 are parallel to the side edges 24b and 24c defining the opening 34. The door 36 is slightly larger than the opening 34 so as to overlap the rear wall 24 along the side edges 24b and 24c (FIG. 5) and the bottom edge 24d (FIG. 4). In the lower position for initial loading, the top edge 42 of the door 36 is positioned to run along the bottom edge 24d of the opening 34, and as the door 36 is moved vertically as seed accumulates in the bin 14 during loading, the top edge 42 is moved toward the top to ultimately be aligned generally with the top edge 24a of the rear wall 24 of the bin 14.

Referring to FIGS. 2, 3 and 5, the door assembly 10 includes a pair of elongated rails 46 and 48 mounted to the bin 14 to run along the side edges 24b and 24c defining the opening 34, respectively. The rails 46 and 48 are designed to mount and guide the door 36 for vertical movement over the opening 34. More specifically, each rail 46 and 48 has a generally U-shaped cross-section formed from three elongated and generally planar strips referred to as a mounting strip 50, a spacer strip 52 and a retainer strip 54.

As viewed in cross-section, the mounting strip 50 of each rail 46 and 48 is used for attachment to the rear wall 24 and rests flush against the rear wall 24 along the respective edges 24b and 24c. The rails can be made from any durable material, such as metal, and are affixed to the rear wall with any suitable fasteners, such as bolts, screws or welds. The spacer strip 52 extends perpendicular from the mounting strip 50 to form an offset "T" therewith, and the retainer strip 54 extends parallel to the mounting strip 50 and forms an "L" with the retainer strip 52. The three strips 50, 52 and 54 define a channel 56, and the rails 46 and 48 are attached to the rear wall 24 so that the channels 56 open toward one another and the opening 34.

The channels 56 define a substantially vertical path of travel for the door 36. The rails 46 and 48 extend below the upper portion 18 of the bin 14 so that the top edge 42 of the door 36 is positionable near the lower edge 24d of the opening 34 to maximize the opening 34 for initial loading.

To facilitate travel along the rails 46 and 48, the door 36 is provided with a pair of rollers 58 and 60 journaled at each edge 38 and 40, with one located adjacent the top edge 42 and another adjacent the lower edge 44. The rollers 58 and 60 are received in the channels 56 of the rails 46 and 48 to mount the door 36 to the rear wall 24. The channel 56 provides sufficient clearance so that the rollers are able to freely roll between the mounting strip 50 and the retainer strip 54 of each rail 46 and 48 without undesirable wobble or play for smooth travel. The rollers can be made from any durable and wear resistant material and can be attached with any suitable fastener that provides free rotational movement.

Referring to FIGS. 1, 3 and 4, the loading assembly 10 includes a commercially available dual direction hydraulic piston 62 to raise and lower the door 36. The piston 62 is connected to the door 36 through an actuator arm 64. A truss system 66 extending from the right rail 48 in the same general plane as the door 36 mounts the piston 62 and the actuator arm 64 at the bin 14 for operation. Depending on the bin 14, the truss system 66, however, may be mounted to extend from the left rail 46.

The truss system 66 includes a horizontal truss 68, a vertical truss 70 and an angled truss 72. The horizontal truss 68 extends along the top edge of the bin 14 (FIG. 5). The vertical truss 70 extends down from the horizontal truss 68 parallel to the right rail 48 and terminates in length slightly below the vertical height of the lower edge 24d. The angled truss 72 extends from the lower end of the vertical truss 70 to the right rail 48 below the lower edge 24d of the opening 34. The angled truss 72 provides structural support to the truss system 66. The angled truss 72 preferably angles in the range of about 45 to 65 degrees relative to the right rail 48. The trusses may be constructed of any material, such as metal, and can have a square tubular cross-section. The trusses may be attached together and to the bin with any suitable fastener, such as bolts, screws or welds.

The actuator arm 64 includes a first end 74 pivotally mounted to the vertical truss 70 and a second end 76 pivotally mounted to the door 36. The piston 62 includes a piston rod 78 with a free end 79 that is pivotally attached to the actuator arm 64 to pivot the actuator arm 64 about the first end 74 to raise and lower the door 36.

More particularly, a first pivot 80 attaches the first end 74 of the actuator arm 64 to a tab 82 extending from the vertical truss 70 at a location adjacent the junction between the vertical truss 70 and the angled truss 72. A second pivot 84 attaches the second end 76 to the door 36. The second end 76 of the arm 64 also includes a slot 86 that runs longitudinally with the arm 64 for receiving a pivot pin 88 extending from the door 36 at the second pivot 84. A washer and nut fastener 89 may be used to clamp the arm 64 to the door 36 at the pin 88. The slot 86 allows the pivot pin 88 to slide therein as the piston 62 rotates the actuator arm 64, and the second end 76 of the actuator arm 64 travels in an arcuate path relative to the door 36. In effect, the slot 86 allows the distance between the first and second pivots 80 and 84 to change as the door 36 is shifted upward during loading operations. That is, in shifting from the lower position to the upper position, the distance decreases until the arm 64 is approximately parallel with the top edge 42 of the door 36 and then it increases again as the door 36 continues on upward to the upper position. Accordingly, the slot 86 is to be of sufficient length to enable the door 36 to be moved freely between the lower and upper positions without applying any additional pressure on the first and second pivots 80 and 84 and the piston 62.

The free end 79 of the piston rod 78 is attached to the actuator arm 64 at a third pivot 90 located slightly to the right of the longitudinal center of the arm 64. A notch 92 is formed in the arm 64 to the right of the third pivot 90 to accommodate any fasteners used at this mount as the piston arm 78 and actuator arm 64 pivot relative to one another during operation. A fourth pivot 94 attaches the piston 62 to a tab 96 extending downward from the horizontal truss 68 at a generally central location therealong. The pivots 80, 84, 90 and 94 are located to provide free movement for the door 36 without bending and undue resistance on the piston 62 and stress on the pivots.

A pair of hydraulic lines 98 supply fluid to the piston 62. A control device 102 located remotely from the piston 62 controls the operation of the piston 62 in response to the amount of material accumulation in the bin and/or the height of the dispensing end 100 of the conveyor 32, in any event, to maintain the desired drop distance into the bin 14 for the seed material to minimize loading impact. This operation is either continuous or incremental and preferably is performed simultaneously as the seed material accumulates in the bin 14 and/or in response to the movement of the conveyor 32. The control device may be operated manually or in response to sensors that monitor the seed material accumulation and/or the movement of the conveyor 32. The sensor may be located at the door 36 or on the conveyor 32.

Figure 7:
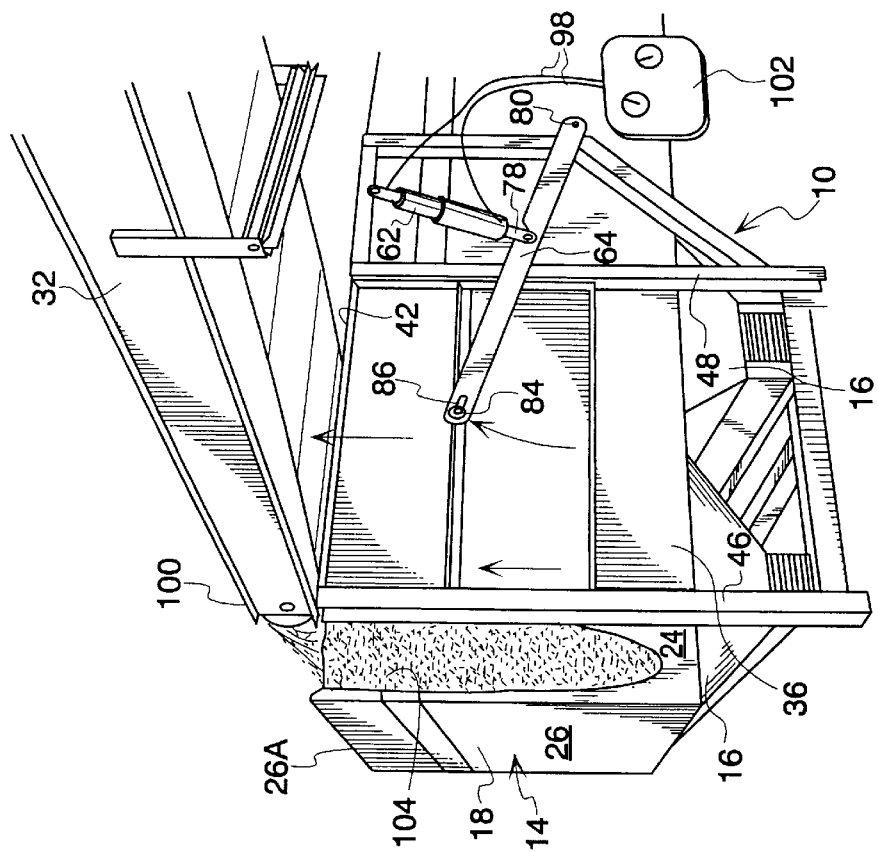
FIG. 7 is a partial perspective view of the planter bin of FIG. 1 illustrating final loading of the agricultural material into the bin with the adjustable loading assembly.
Figure 6:
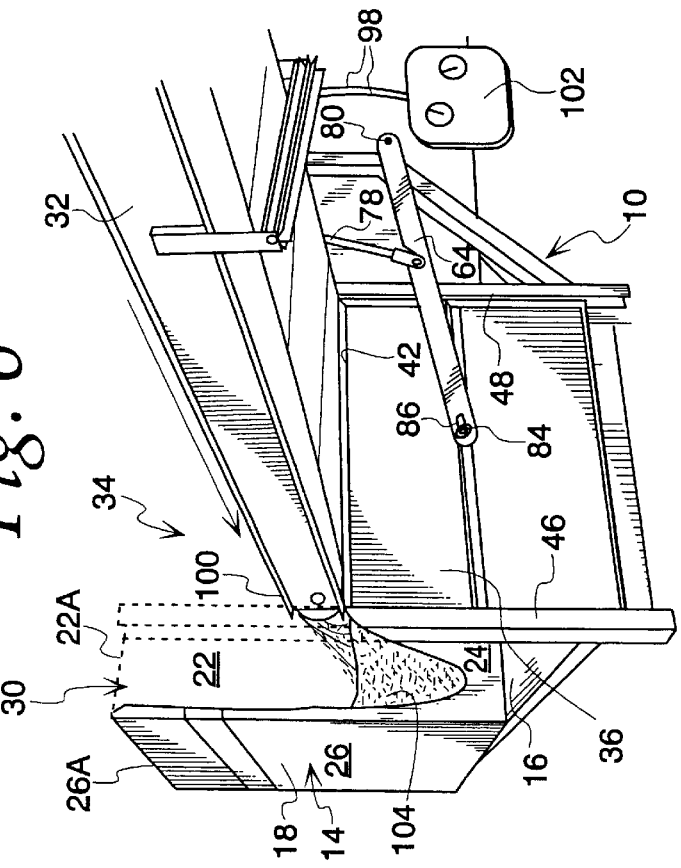
FIG. 6 is a partial perspective view of the planter bin of FIG. 1 illustrating initial loading of the material into the bin with the adjustable loading assembly.

Referring to FIGS. 6 and 7, to load the bin 14, the control device 102 is used to extend the piston rod 78 to set the door 36 to the lower position for initial loading. In this lower position, the top edge 42 of the door 36 is adjacent the bottom edge 24d of the opening 34 (FIG. 3) and, therefore, the conveyor 32 or other transfer device can be extended into the bin 14 through the opening 34 slightly above the top edge 42 of the door 36 for initial loading. In this position, the drop distance for the seed material 104 from the discharge end 100 of the conveyor 32 has been significantly minimize, especially as compared to loading from above the top of the bin 14.

As the seed material 104 accumulates, the conveyor 32 is raised vertically in the opening 34 at a rate that maintains the discharge end 100 within a desired drop distance above the material 104 already loaded into the bin 14. The door 36 is also raised to track the material accumulation and to close the opening 34 to maintain the material 104 in the upper portion 18 of the bin 14. To raise the door 36, the control device 102 is used to actuate the piston 62 to retract the piston rod 78, which pulls the actuator arm to pivot it clockwise about the first pivot 80. As the door 36 moves upward, the second pivot 84 slides in the slot 86 in the arm 64, and the rollers 58 and 60 roll in the channels 56 of the rails 46 and 48. The operation of the control device 102 can be done manually or automatically through sensors in response to the material accumulation and/or movement of the conveyor. This is continued until the upper portion 18 of the bin 14 has been filled to the desired level.

Once the upper portion 18 of the bin 14 has been filled to the desired level, the door 36 is to be in the upper position closing the opening 34. In the upper position, the top edge 42 of the door 36 is aligned generally with the top edge 24a of the rear wall 24 of the bin 14, and the bin 14 can be topped off with seed material 104 with the conveyor 32 out of the opening 34 and above the top of the bin 14. To refill the bin 14, the operation is repeated with the control device 102 being operated to actuate the piston rod 78 to rotate the actuator arm 64 counter-clockwise to reset the door 36 in the lower position.

For example, the following dimensions may be used for an adjustable loading assembly in accordance with the present invention for use with bins for agricultural planters to minimize loading impact on seed material. For access openings of about 3.3 to 3.5 feet (ft.) wide, the door width may be about 3.4 to 3.6 ft. and the height about 2.65 to 2.85 ft. The rails may be about 5.3 to 5.7 ft. in length. As viewed in cross-section, the channel in each of the rails may be about 0.2 to 0.3 ft. wide and 0.16 to 0.2 ft. deep.

The horizontal truss may be about 1.3 to 1.7 ft. in length with the pivot for the piston at about 0.7 to 1.1 ft. from the right rail. The vertical truss may be about 2.8 to 3.2 ft. in length with the pivot for the actuator arm adjacent the lower end. The angled truss may be about 2.3 to 2.7 ft. in length and may be at an angle in the range of 35 to 39 degrees relative to the right rail.

The actuator arm may be about 4.2 to 4.6 ft. in length with one end attached pivotally to the lower end of the vertical truss and the other end attached pivotally to the door. The slot in the second end may be about 0.28 to 0.32 ft. in length. The piston rod is attached pivotally to the actuator arm about 1.5 to 1.8 ft. from its attachment to the vertical truss. The second end is attached to the door about 1.1 to 1.4 ft. down from the top edge and about 1.6 to 1.9 ft. from the left edge of the door.

It will be understood that various changes in the detail, materials and arrangement of parts and assemblies which have been herein described and illustrated in order to explain the nature of the present invention may be made by those skilled in the art within the principle and scope of the present invention as expressed in the appended claims.

What is claimed is:

1. A method of reduced impact loading of material into a bin comprising the steps of:

provinding a bin having a side wall defining an access opening for loading the bin at varying vertical heights and a bottom portion extending from the side wall;

providing a door slidably mounted at the access opening of the bin, the door movable along a predetermined path between a lower position at initial loading to maximize the access opening and selectively to varying upper positions above the lower position as the bin is being loaded to close the access opening;

moving the door to the lower position for initial loading to minimize loading impact;

providing a material dispenser having a discharge end portion;

extending the discharge end portion of the material dispenser into the bin through the access opening over the door with the discharge end portion a predetermined distance above the bottom portion of the bin to minimize loading impact;

selectively raising the discharge end portion in the bin as material accumulates in the bin during loading to maintain the discharge end portion within a predetermined distance range above material generally accumulating in the bin; and selectively raising the door to varying positions above the lower position to close the access opening as material accumulates in the bin.

2. A method in accordance with claim 1 wherein the predetermined distance is generally less than 18 inches above the bottom portion of the bin at initial loading and thereafter above the material generally accumulating in the bin after initial loading.

3. A method in accordance with claim 2 wherein the steps of selectively raising the discharge end portion and the door are generally coordinated contemporaneously as material accumulates in the bin.

4. A method in accordance with claim 3 further comprising the steps of measuring material accumulation and sending a signal representing the measurement to selectively raise the door as material accumulates in the bin.

5. A method in accordance with claim 4 further comprising the step of selectively raising both the discharge end portion and the door generally contemporaneously in response to the measurement of material accumulation.

* * * * *